US011185067B2

(12) United States Patent
Gries et al.

(10) Patent No.: US 11,185,067 B2
(45) Date of Patent: Nov. 30, 2021

(54) ATTRACTANTS FOR RATS

(71) Applicant: Gerhard Gries, Coquitlam (CA)

(72) Inventors: Gerhard Gries, Coquitlam (CA);
Stephen Joseph Takacs, Hope (CA);
Regine Gries, Coquitlam (CA)

(*) Notice: Subject to any disclaimer, the term of this patent is extended or adjusted under 35 U.S.C. 154(b) by 344 days.

(21) Appl. No.: 16/060,573

(22) PCT Filed: Dec. 9, 2016

(86) PCT No.: PCT/CA2016/051448
§ 371 (c)(1),
(2) Date: Jun. 8, 2018

(87) PCT Pub. No.: WO2017/096485
PCT Pub. Date: Jun. 15, 2017

(65) Prior Publication Data
US 2018/0352802 A1  Dec. 13, 2018

Related U.S. Application Data

(60) Provisional application No. 62/264,914, filed on Dec. 9, 2015, provisional application No. 62/319,244, filed on Apr. 6, 2016.

(51) Int. Cl.
*A01M 25/00* (2006.01)
*A01M 23/00* (2006.01)
(Continued)

(52) U.S. Cl.
CPC .......... *A01M 25/004* (2013.01); *A01M 23/00* (2013.01); *A01M 23/02* (2013.01);
(Continued)

(58) Field of Classification Search
None
See application file for complete search history.

(56) References Cited

U.S. PATENT DOCUMENTS 4,021,568 A * 5/1977 Suttie ................... A01N 49/00
514/457
4,105,992 A 8/1978 Luciano
(Continued)

FOREIGN PATENT DOCUMENTS

CN  1500387 A * 6/2004
CN  201967568 U  9/2011
(Continued)

OTHER PUBLICATIONS

Machine-assisted English translation for JP2005-120048. (Year: 2005).*
Zhang et al ("Sex- and Gonad-Affecting Scent Compounds and 3 Male Pheromones in the Rat", Chemical Senses, vol. 33, p. 611-621). (2008).*
English translation for CN-1500387-A (2004).*
Bernstein ("Rodent Control: Weighing Your Mouse Trap Options", an internet article obtained from the website https://ohmyapt. apartmentratings.com/rodent-control-weighing-your-mouse-trap-options.html). (2009).*
(Continued)

*Primary Examiner* — Sin J Lee
(74) *Attorney, Agent, or Firm* — Ulmer & Berne LLP

(57) ABSTRACT

Rat attractant compositions attractive to the rat species *Rattus norvegicus* are disclosed, which compositions are constituted of compounds found in the headspace volatiles of male urine odor or female urine odor. Said compositions are respectively termed male pheromone blend (MPB) and comprises 2-heptanone, 4-heptanone, 3-ethyl-2-heptanone, 2-octanone, 2-nonanone, and 4-nonanone in a ratio of 10:100:10:1:1:10 respectively, or female pheromone blend (FPB) and comprises 2-methyl-butyric acid, 3-methyl-butyric acid, heptanal, hexanoic acid, 2-phenylacetaldehyde, nonanal, and decanal in a ratio of 20:20:10:30:5:20:10. Devices including the rat attractant compositions, and methods of using said rat attractant compositions, are also disclosed.

19 Claims, 12 Drawing Sheets

(51) Int. Cl.
*A01M 23/02* (2006.01)
*A01M 23/36* (2006.01)
*A01M 23/38* (2006.01)
*A01M 27/00* (2006.01)
*A01N 27/00* (2006.01)
*A01N 31/02* (2006.01)
*A01N 31/08* (2006.01)
*A01N 31/14* (2006.01)
*A01N 31/16* (2006.01)
*A01N 43/08* (2006.01)
*A01N 43/38* (2006.01)
*A01N 25/00* (2006.01)
*A01N 35/02* (2006.01)
*A01N 35/04* (2006.01)
*A01N 37/02* (2006.01)
*A01N 43/60* (2006.01)

(52) U.S. Cl.
CPC ............ *A01M 23/36* (2013.01); *A01M 23/38* (2013.01); *A01N 25/004* (2013.01); *A01N 27/00* (2013.01); *A01N 31/02* (2013.01); *A01N 31/08* (2013.01); *A01N 31/14* (2013.01); *A01N 31/16* (2013.01); *A01N 35/02* (2013.01); *A01N 35/04* (2013.01); *A01N 37/02* (2013.01); *A01N 43/08* (2013.01); *A01N 43/38* (2013.01); *A01N 43/60* (2013.01); *A01M 27/00* (2013.01)

(56) References Cited

U.S. PATENT DOCUMENTS

| | | | |
|---|---|---|---|
| 4,376,112 A | * | 3/1983 | Miller ................ A01N 25/26 424/419 |
| 2005/0181003 A1 | | 8/2005 | Endepols |
| 2008/0216387 A1 | * | 9/2008 | Peters ................ A01M 23/38 43/98 |

FOREIGN PATENT DOCUMENTS

| | | |
|---|---|---|
| DE | 10326833 A1 | 2/2005 |
| EP | 1279334 B1 | 1/2003 |
| JP | 2005120048 A | 5/2005 |
| SU | 1724148 A1 | 4/1992 |
| WO | 96003037 A1 | 2/1996 |
| WO | 2013003946 A1 | 1/2013 |
| WO | 2013173925 A1 | 11/2013 |

OTHER PUBLICATIONS

Takacs et al ("The Sex Attractant Pheromone of Male Brown Rats: Identification and Field Experiment", Angewandte Chemie, vol. 55 (20), p. 6062-6066. (Apr. 6, 2016) (Year: 2016).*

"Rats and Mice: What's the Difference". ratbehaviororg, 2010. Web May 4, 2016. http://web.archive.org/web/20100525165650/http://www.ratbehavior.org/RatsMice.htm.

* cited by examiner ional patent application Ser. No. 62/264,914, entitled
ATTRACTANTS FOR RATS

REFERENCE TO RELATED APPLICATIONS

The present application claims the priority benefit of U.S. provisional patent application Ser. No. 62/264,914, entitled ATTRACTANTS FOR RATS, filed Dec. 9, 2015, and U.S. provisional patent application Ser. No. 62/319,244, entitled ATTRACTANTS FOR RATS, filed Apr. 6, 2016, and hereby incorporates both applications herein by reference in their entirety.

TECHNICAL FIELD

The present disclosure generally relates to a composition for attracting one or more rats, and methods of attracting one or more rats using the composition.

BACKGROUND

Rats are significant global pests. They can inflict harm by vectoring disease-causing pathogens, soiling food, spreading allergens, diminishing yields of agricultural crops, endangering island seabird colonies, and as invasive species by harming indigenous fauna. These adverse effects have prompted ongoing efforts to trap or poison rats. However, rats exhibit neophobia (the fear of new objects). The lag time it takes neophobic rodents to get used to the presence of newly-placed traps, or trap boxes containing traps, and to enter them and get trapped, greatly reduces the effectiveness of rat control (Inglis et al. 1996).

SUMMARY

According to one embodiment, a rat attractant composition includes one or more isolated additives. Each isolated additive is 3-ethyl-2-pentanone, 2-heptanone, 4-heptanone, 3-ethyl-2-heptanone, 2-octanone, 2-nonanone, 4-nonanone, 2,3,5-trimethylpyrazine, tetramethylpyrazine, 2-methyl-butyric acid, 3-methyl-butyric acid, heptanal, hexanoic acid, benzaledhyde, 2-phenylacetaldehyde, nonanal, or decanal. The rat attractant composition is attractive to at least rats of the species Rattus norvegicus.

According to another embodiment, a device for attracting one or more rats includes a housing for receiving the one or more rats, and a rat attractant composition. The rat attractant composition includes one or more isolated additives. Each isolated additive is 3-ethyl-2-pentanone, 2-heptanone, 4-heptanone, 3-ethyl-2-heptanone, 2-octanone, 2-nonanone, 4-nonanone, 2,3,5-trimethylpyrazine, tetramethylpyrazine, 2-methyl-butyric acid, 3-methyl-butyric acid, heptanal, hexanoic acid, benzaledhyde, 2-phenylacetaldehyde, nonanal, or decanal. The rat attractant composition is adjacent to or included within the housing. The rat attractant composition is attractive to at least rats of the species Rattus norvegicus.

According to another embodiment, a method of attracting one or more rats includes providing a rat attractant composition. The rat attractant composition includes one or more isolated additives. Each isolated additive is 3-ethyl-2-pentanone, 2-heptanone, 4-heptanone, 3-ethyl-2-heptanone, 2-octanone, 2-nonanone, 4-nonanone, 2,3,5-trimethylpyrazine, tetramethylpyrazine, 2-methyl-butyric acid, 3-methyl-butyric acid, heptanal, hexanoic acid, benzaledhyde, 2-phenylacetaldehyde, nonanal, or decanal. The rat attractant composition is attractive to at least rats of the species Rattus norvegicus.

DETAILED DESCRIPTION OF THE INVENTION

Figure 1:
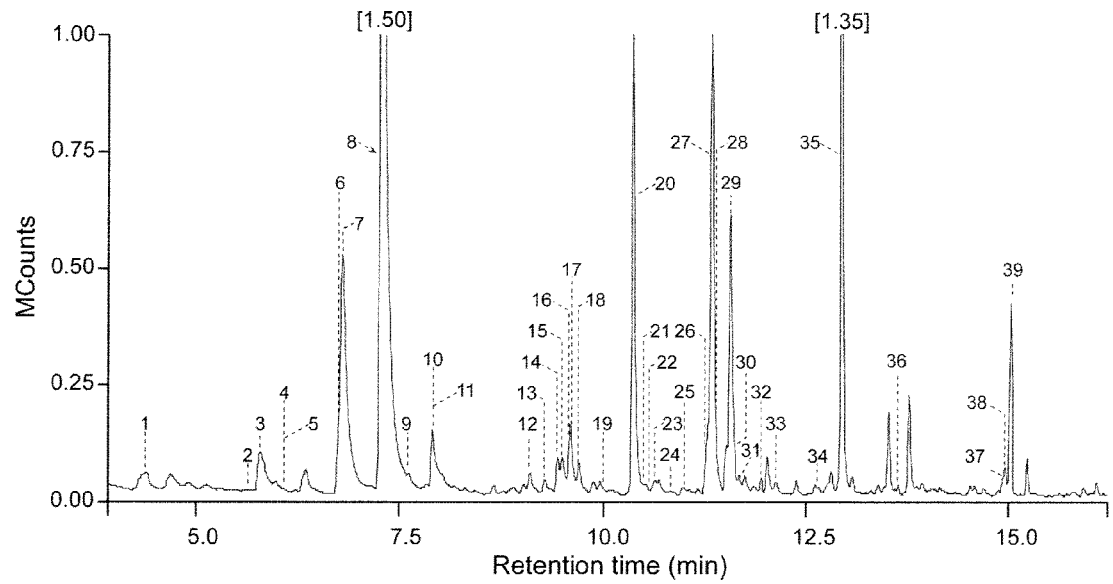
FIG. 1 depicts a total ion chromatogram showing the volatile components emanating from urine- and feces-soiled bedding material of Rattus norvegicus adult males.

The term "isolated" as used herein means separated from materials with which the compound is normally associated with in a native state.

The term "purified" as used herein refers to material that has been isolated under conditions that reduce, or eliminate, the presence of unrelated materials, i.e., contaminants, including native materials from which the material is obtained. Purified materials substantially free of contaminants as used herein means about 50% or more pure, about 90% or more pure, and about 99% or more pure in various embodiments. Purity can be evaluated by methods known in the art.

The term "synthetic" as used herein means artificially produced by chemical processes, or other processes initiated by human energy, as opposed to compounds formed by natural processes.

The term "lethal" as used herein means sufficient to result in immobilization, or death, of about 50% or more, about 55% or more, about 60% or more, about 65% or more, about 70% or more, about 75% or more, about 80% or more, about 85% or more, about 90% or more, about 95% or more, and about 99% or more, rats.

The term "lethal agent" as used herein means an agent that is capable of immobilizing or killing about 50% or more, about 55% or more, about 60% or more, about 65% or more, about 70% or more, about 75% or more, about 80% or more, about 85% or more, about 90% or more, about 95% or more, and about 99% or more, rats that are exposed to an appropriate dose, number, or intensity, over an appropriate amount of time.

The term "chemosterilant" as used herein means a substance that is capable of sterilizing about 50% or more, about 55% or more, about 60% or more, about 65% or more, about 70% or more, about 75% or more, about 80% or more, about 85% or more, about 90% or more, about 95% or more, and about 99% or more, rats that are exposed to an appropriate dose, number, or intensity, of the substance over an appropriate amount of time.

The term "rat" as used herein refers to at least one rat of the genus *Rattus*, including the brown rat, *Rattus norvegicus*, which is also known as the Norway rat, Norwegian rat, and wharf rat.

Certain embodiments of the present disclosure relate to a composition for attracting one or more rats. In certain embodiments, the composition includes one or more additives. The additives can be pheromones attractive to rats and suitable additives can include 3-ethyl-2-pentanone, 2-heptanone, 4-heptanone, 3-ethyl-2-heptanone, 2-octanone, 2-nonanone, 4-nonanone, 2,3,5-trimethylpyrazine, tetramethylpyrazine, 2-methyl-butyric acid, 3-methyl-butyric acid, heptanal, hexanoic acid, benzaldehyde, 2-phenylacetaldehyde, nonanal, and decanal. The described compositions can include one, two, three, four, five, six, seven, eight, nine, ten, eleven, twelve, thirteen, fourteen, or fifteen of the additives. The additive can be isolated, purified, and/or synthetic.

In certain embodiments, a composition can include one or more additives. The additives can substantially be produced only by male rats and the additives can include 3-ethyl-2-pentanone, 2-heptanone, 4-heptanone, 3-ethyl-2-heptanone, 2-octanone, 2-nonanone, 4-nonanone, 2,3,5-trimethylpyrazine, and tetramethylpyrazine.

In certain embodiments, a composition can include one or more additives, wherein the additives can be substantially produced only by female rats. In such embodiments, the additives can include 2-methyl-butyric acid, 3-methyl-butyric acid, heptanal, hexanoic acid, 2-phenylacetaldehyde, nonanal, and decanal.

In certain embodiments, a composition includes one or more additives, wherein the additives can include 3-ethyl-2-pentanone, 2-heptanone, 4-heptanone, 3-ethyl-2-heptanone, 2-octanone, 2-nonanone, 4-nonanone, 2,3,5-trimethylpyrazine, tetramethylpyrazine, and combinations thereof, and the composition can be useful for attracting male and/or female rats. In certain embodiments, the composition can attract female rats.

In certain embodiments, the composition can include one or more additives, wherein the additives can include 2-methyl-butyric acid, 3-methyl-butyric acid, heptanal, hexanoic acid, 2-phenylacetaldehyde, nonanal, benzaldehyde, decanal, and combinations thereof, and the composition can be useful for attracting male and/or female rats. In certain embodiments, the composition can attract female rats.

In certain embodiments, the described compositions can further include one or more lethal agents and/or chemosterilants.

In certain embodiments, the lethal agent can be a chemical that is capable of causing immobilization or death of one or more rats. For example, the chemical can be one or more of an anticoagulant and a toxicant. In certain embodiments, examples of suitable anticoagulant can include warfarin ((RS)-4-hydroxy-3-(3-oxo-1-phenylbutyl)-2H-chromen-2-one), chlorophacinone (2-[2-(4-chlorophenyl)-1-oxo-2-phenylethyl]indane-1,3-dione), diphacinone (2-(diphenylacetyl)-1H-indene-1,3(2H)-dione), Bromadiolone (3-[3-[4-(4-bromophenyl)phenyl]-3-hydroxy-1-phenylpropyl]-2-hydroxychromen-4-one), difethialone (3-[3-[4-(4-bromophenyl)phenyl]-1-tetralinyl]-2-hydroxy-4-thiochromenone), brodifacoum (3-[3-[4-(4-bromophenyl)phenyl]-1,2,3,4-tetrahydronaphthalen-1-yl]-2-hydroxychromen-4-one), and combinations thereof. In certain embodiments, suitable toxicants can include bromethalin (N-methyl-2,4-dinitro-6-(trifluoromethyl)-N-(2',4',6'-tribromophenyl)aniline), cholecalciferol ((3β,5Z,7E)-9,10-secocholesta-5,7,10(19)-trien-3-ol), zinc phosphide (zinc phosphide/trizinc diphosphide), strychnine (strychnidin-10-one), and combinations thereof.

In certain embodiments, the chemosterilant can be a chemical that is capable of sterilizing one or more rats. For example, suitable chemosterilant chemicals that can sterilize female rates can include one or more of mestranol, quinoestrol, diethylstilbestrol, methyl testosterone, the 3-cyclopentyl ester of 17α-hexa-1'3'-diynyloestra-1,3,5(10)-trien-17β-ol, α-chlorhydrin, and 4-vinylcyclohexene diepoxide.

In certain embodiments, the described composition can further include a food bait. Suitable food baits can include natural foodstuffs such as meat, cheese, eggs, nuts, and/or grains. For example, a food bait can include lard and cracklings, cereal flour (e.g., oat flour and/or rice flour), cereal bran (e.g., wheat bran), gelling agent(s) (e.g., gelatin and/or agar), sugar (e.g., fructose), oil(s) (e.g., safflower oil and/or salmon oil), emulsifier(s) (e.g., soy lecithin), humectant(s) (e.g., carrageenan gum powder), water, chemical attractants (e.g., 2-hydroxy-3-methylcyclopent-2-en-1-one, 2,3-butanedione, 3-methylbutanal, 5-methyl-(E)-2-hepten-4-one, 5-methyl-4-heptanone, γ-octalactone, dimethyl trisulfide, and/or butyric acid), and combinations thereof.

In certain embodiments, the described composition can further include one or more additional components. For example, the described compositions can include butyric acid, furan-2-carbaldehyde, 3-ethyl-2-pentanone, 3-methylbutyric acid, 2-methyl-butyric acid, 1-hexanol, heptanal, dimethyl sulfone, 2,5-dimethyl pyrazine, benzaldehyde, dimethyl trisulfide, phenol, 1-octen-3-ol, hexanoic acid, 6-methyl-5-hepten-2-one, 2,3,5-trimethylpyrazine, 1-methyl-4-(1-methylethenyl)-cyclohexene, benzyl alcohol, (3E)-octen-2-one, 2-phenylacetaldehyde, 5-ethyldihydrofuran-2(3H)-one, benzoic acid, 4-methylphenol, 2,3,5,6-tetramethylpyrazine, 2-methoxyphenol, nonanal, 2-phenylethan-1-ol, 1,2-dimethoxybenzene, 4-ethylphenol, decanal, 2-undecanone, 1H-indole, tridecane, 2-hydroxy-3-methylcyclopent-2-en-1-one, dimethyl trisulfide, 2,3-butanedione, 3-methylbutanal, 5-methyl-(E)-2-hepten-4-one, 3-methyl-4-heptanone, γ-octalactone, 4-hydroxy-2,5-dimethylfuran-3-one, nonanoic acid, decanoic (capric) acid, dodecanoic (lauric) acid, tetradecanoic (myristic) acid, hexadecanoic (palmitic) acid, (9Z)-octadecenoic (oleic) acid, octadecanoic (stearic) acid, lactic acid, glycerol, and combinations thereof. In certain embodiments, the additional compound can alternatively, or additionally, be a hormone that is excreted by a rat. For example, the one or more additional compounds can be a hormone that is excreted by a female rat when it is in estrus. Examples of hormones that are excreted by female rats in estrus are disclosed in Birke, Lynda, "Scent-marking and the oestrous cycle of the female rat," Animal Behaviour, Vol. 26, Part 4, pp. 1165-1166 (1978), the disclosure of which is incorporated herein by reference in its entirety. The additional compounds can be isolated, purified, and/or synthetic.

In certain embodiments, the compositions described herein can be used to attract one or more rats. The composition can be used as a bait, and, can optionally be included in a trap. In certain embodiments, a composition consisting essentially of the one or more additives can be used to attract one or more rats. In certain embodiments, the composition can include one, two, three, four, five, six, seven, eight, nine, ten, eleven, twelve, thirteen, fourteen, or fifteen additives. In certain embodiments, the one or more additives can be selected from pheromones substantially produced only by male rats or only by female rats. The additives can be isolated, purified, and/or synthetic.

In certain embodiments, a composition including one or more additives in an amount of about 1% to about 99% of the composition can be used to attract one or more rats. For example, the one or more additives can be included in an amount of about 1% or more, about 2%, about 5% or more, about 7.5% or more, about 10% or more, about 12.5% or more, about 15% or more, about 17.5% or more, about 20% or more, about 22.5% or more, about 25% or more, about 27.5% or more, about 30% or more, about 32.5% or more, about 35% or more, about 37.5% or more, about 40% or more, about 42.5% or more, about 45% or more, about 47.5% or more, about 50% or more, about 52.5% or more, about 55% or more, about 57.5% or more, about 60% or more, about 62.5% or more, about 65% or more, about 67.5% or more, about 70% or more, about 72.5% or more, about 75% or more, about 77.5% or more, about 80% or more, about 82.5% or more, about 85% or more, about 87.5% or more, about 90% or more, about 92.5% or more, about 95% or more, about 97.5% or more, and about 99% or more by weight of the composition.

In certain embodiments, the one or more additives can be included in an amount of about 1% or less, about 2% or less, about 5% or less, about 7.5% or less, about 10% or less, about 12.5% or less, about 15% or less, about 17.5% or less, about 20% or less, about 22.5% or less, about 25% or less, about 27.5% or less, about 30% or less, about 32.5% or less, about 35% or less, about 37.5% or less, about 40% or less, about 42.5% or less, about 45% or less, about 47.5% or less, about 50% or less, about 52.5% or less, about 55% or less, about 57.5% or less, about 60% or less, about 62.5% or less, about 65% or less, about 67.5% or less, about 70% or less, about 72.5% or less, about 75% or less, about 77.5% or less, about 80% or less, about 82.5% or less, about 85% or less, about 87.5% or less, about 90% or less, about 92.5% or less, about 95% or less, about 97.5% or less, and about 99% or less, by weight of the composition. The composition can be used as a bait, and can optionally be included in a trap. The additive can be isolated, purified, and/or synthetic.

In certain embodiments, the composition can also include at least one lethal agent in an amount of about 1% to about 99% of the composition. The lethal agent can be a chemical that is capable of immobilizing or killing at least one rat. In certain embodiments, the lethal agent(s) can be included in an amount of about 1% or more, about 2%, about 5% or more, about 7.5% or more, about 10% or more, about 12.5% or more, about 15% or more, about 17.5% or more, about 20% or more, about 22.5% or more, about 25% or more, about 27.5% or more, about 30% or more, about 32.5% or more, about 35% or more, about 37.5% or more, about 40% or more, about 42.5% or more, about 45% or more, about 47.5% or more, about 50% or more, about 52.5% or more, about 55% or more, about 57.5% or more, about 60% or more, about 62.5% or more, about 65% or more, about 67.5% or more, about 70% or more, about 72.5% or more, about 75% or more, about 77.5% or more, about 80% or more, about 82.5% or more, about 85% or more, about 87.5% or more, about 90% or more, about 92.5% or more, about 95% or more, about 97.5% or more, and about 99% or more by weight of the composition.

In certain embodiments, the lethal agent(s) can be included in an amount of about 1% or less, about 2% or less, about 5% or less, about 7.5% or less, about 10% or less, about 12.5% or less, about 15% or less, about 17.5% or less, about 20% or less, about 22.5% or less, about 25% or less, about 27.5% or less, about 30% or less, about 32.5% or less, about 35% or less, about 37.5% or less, about 40% or less, about 42.5% or less, about 45% or less, about 47.5% or less, about 50% or less, about 52.5% or less, about 55% or less, about 57.5% or less, about 60% or less, about 62.5% or less, about 65% or less, about 67.5% or less, about 70% or less, about 72.5% or less, about 75% or less, about 77.5% or less, about 80% or less, about 82.5% or less, about 85% or less, about 87.5% or less, about 90% or less, about 92.5% or less, about 95% or less, about 97.5% or less, and about 99% or less, by weight of the composition.

In certain embodiments, the composition can also, or alternatively, include one or more chemosterilants in an amount of about 1% to about 99% of the composition. The chemosterilant(s) can be a chemical that is capable of sterilizing at least one rat. In certain embodiments, the chemosterilant(s) can be effective to sterilize female rats. In certain embodiments, the chemosterilant(s) can be included in an amount of about 1% or more, about 2%, about 5% or more, about 7.5% or more, about 10% or more, about 12.5% or more, about 15% or more, about 17.5% or more, about 20% or more, about 22.5% or more, about 25% or more, about 27.5% or more, about 30%, about 32.5% or more, about 35% or more, about 37.5% or more, about 40% or more, about 42.5% or more, about 45% or more, about 47.5% or more, about 50% or more, about 52.5% or more, about 55% or more, about 57.5% or more, about 60% or more, about 62.5% or more, about 65% or more, about 67.5% or more, about 70% or more, about 72.5% or more, about 75% or more, about 77.5% or more, about 80% or more, about 82.5% or more, about 85% or more, about 87.5% or more, about 90% or more, about 92.5% or more, about 95% or more, about 97.5% or more, and about 99% or more by weight of the composition.

In certain embodiments, the chemosterilant(s) can be included in an amount of about 1% or less, about 2% or less, about 5% or less, about 7.5% or less, about 10% or less, about 12.5% or less, about 15% or less, about 17.5% or less, about 20% or less, about 22.5% or less, about 25% or less, about 27.5% or less, about 30% or less, about 32.5% or less, about 35% or less, about 37.5% or less, about 40% or less, about 42.5% or less, about 45% or less, about 47.5% or less, about 50% or less, about 52.5% or less, about 55% or less, about 57.5% or less, about 60% or less, about 62.5% or less, about 65% or less, about 67.5% or less, about 70% or less, about 72.5% or less, about 75% or less, about 77.5% or less, about 80% or less, about 82.5% or less, about 85% or less, about 87.5% or less, about 90% or less, about 92.5% or less, about 95% or less, about 97.5% or less, and about 99% or less, by weight of the composition.

In certain embodiments, the described compositions can include no more than two, no more than three, no more than four, no more than five, no more than six, no more than seven, or no more than eight additives. In certain embodiments, the described compositions can include at least one, at least two, at least three, at least four, at least five, at least six, at least seven, at least eight, at least nine, at least ten, at least eleven, at least twelve, at least thirteen, at least fourteen, or at least fifteen additives. The additive can be isolated, purified, and/or synthetic.

In certain embodiments, the described compositions can consist essentially of no more than two, no more than three, no more than four, no more than five, no more than six, no more than seven, or no more than eight additives. In certain embodiments, the described compositions can consist essentially of at least one, at least two, at least three, at least four, at least five, at least six, at least seven, at least eight, at least nine, at least ten, at least eleven, at least twelve, at least thirteen, at least fourteen, or at least fifteen additives. The additive can be isolated, purified, and/or synthetic.

In certain embodiments, the described compositions can consist of no more than two, no more than three, no more than four, no more than five, no more than six, no more than seven, no more than eight, no more than nine, no more than ten, no more than eleven, no more than twelve, no more than thirteen, no more than fourteen, or no more than fifteen additives. The additive can be isolated, purified, and/or synthetic.

In certain embodiments, the described compositions can consist essentially of no more than two, no more than three, no more than four, no more than five, no more than six, no more than seven, no more than eight, no more than nine, no more than ten, no more than eleven, no more than twelve, no more than thirteen, no more than fourteen, or no more than fifteen additives and a lethal agent. In certain embodiments, the described compositions can include at least one, at least two, at least three, at least four, at least five, at least six, at least seven, at least eight, at least nine, at least ten, at least eleven, at least twelve, at least thirteen, at least fourteen, or at least fifteen additives and a lethal agent. The additive can be isolated, purified, and/or synthetic.

In certain embodiments, the composition that attracts one or more rats can be formulated as a granule, a solid block, a gel, a powder, a paste, a liquid, or combinations thereof.

Any of the compositions described herein can be included in a device for attracting one or more rats. The device can include a composition including the one or more additives and, optionally, one or more lethal agents and chemosterilants. In certain embodiments, the device can include a housing for receiving one or more rats. The composition can be adjacent to, or included within, the housing. The housing can also include a food bait that is adjacent to, or included within, the composition. The housing can allow the rat to enter and leave the device after ingesting the composition. The housing can be configured so that a rat can enter the device, but other animals are less likely to be able to enter the device. For example, the housing can contain a size-restrictive entryway, and the housing can optionally include a sharp turn. The device can be refillable or can be a single-use device.

In certain embodiments, the device for attracting one or more rats can be a device that is capable of producing an acoustic signal to attract rats. Such devices are described, for example, in U.S. Patent Publication No. 2015/0128479, the disclosure of which is incorporated herein by reference in its entirety.

The device can also include a trap in certain embodiments. The trap can be an immobilizing trap (e.g., a sticky trap or a chamber trap), an impaling trap, a compression trap, an asphyxiation trap (e.g., a snare trap, a drowning trap, or a noose-based trap), an electrocution trap, a skull-fracturing piston trap, a catch-and-release trap, or a combination thereof.

As can be appreciated, the device can trap, or kill, more than one rat in certain embodiments. For example, a device for attracting one or more rats can include multiple single use traps, a plurality of chambers that can each trap one rat, or a single chamber that can trap multiple rats in various embodiments.

Other variations to the device are also possible in certain embodiments. For example, a device can automatically kill and remove a rat in certain examples. In such examples, a rat can be lured into a trap housing that kills the rat using, for example, an impaling trap, a compression trap, an asphyxiation trap, an electrocution trap, or a skull-fracturing piston trap. Once the rat has been killed, the trap can reset itself releasing the rat to fall out of both the trap housing and device. As can be appreciated, such devices can kill multiple rats without human intervention. In certain embodiments, such devices can be mechanically powered (using e.g., a compressed gas cartridge) or can be electrically powered.

Figure 8:
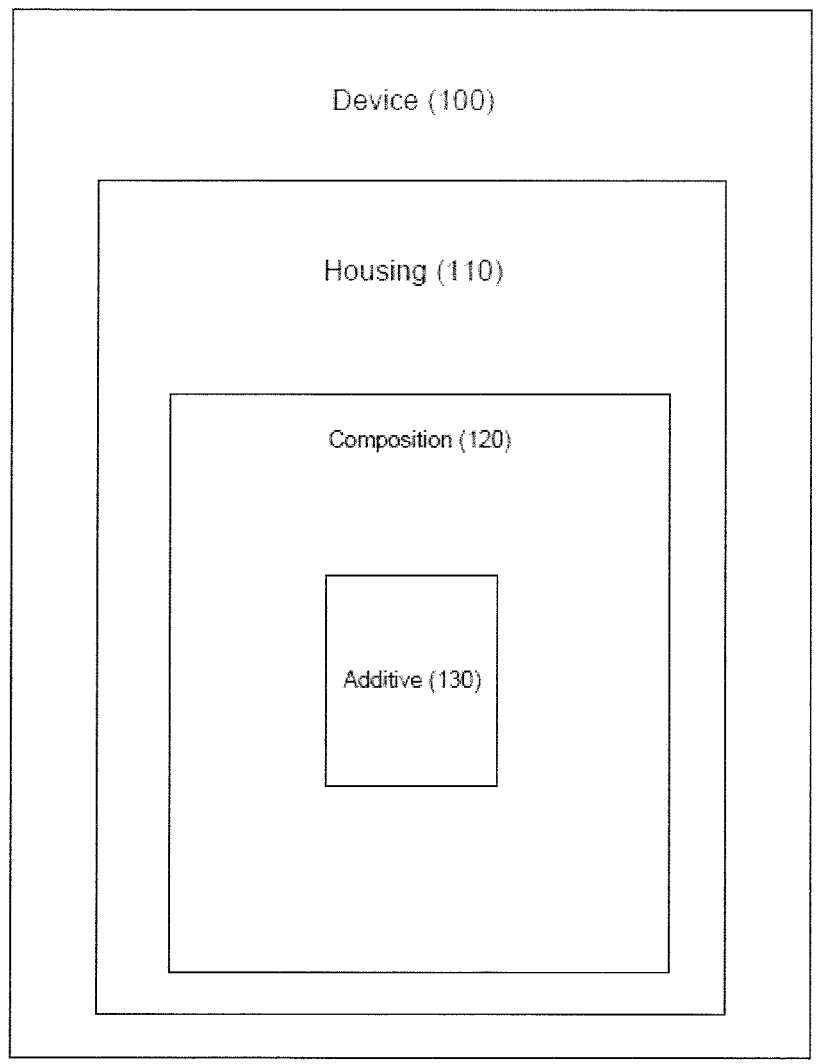
FIG. 8 depicts an example of a device according to one embodiment.

In certain embodiments, a device includes a housing for receiving a rat, as well as a composition which includes one or more additives. Referring to FIG. 8, a device according to one embodiment is disclosed. The device (100) of FIG. 8 can include a housing (110). The housing (110) can include a composition (120), which includes one or more additives (130). In certain embodiments, the housing (110) can also include at least one food bait. In certain embodiments, the housing (110) can also include a trap. The composition (120) can be included within, or adjacent to, the trap within the housing (110).

Figure 9:
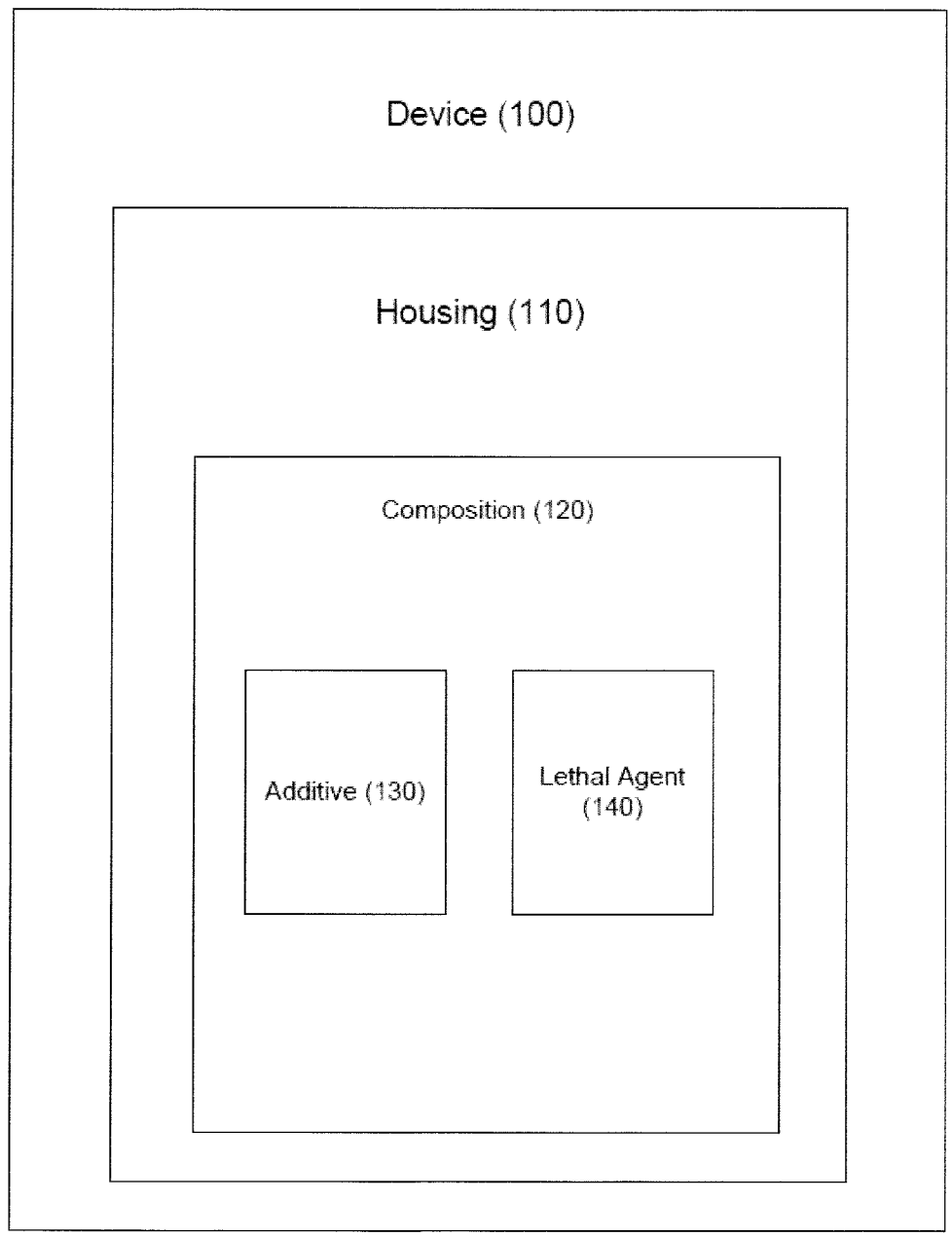
FIG. 9 depicts an example of a device according to another embodiment.

Referring to FIG. 9, a device according to an embodiment is disclosed. The device (100) of FIG. 9 can include a housing (110). The housing (110) can include a composition (120), which includes one or more additives (130) and one or more lethal agents (140). In certain embodiments, the housing (110) can also include at least one food bait. In certain embodiments, the housing (110) can also include a trap. The composition (120) can be included within, or adjacent to, the trap within housing (110).

Figure 10:
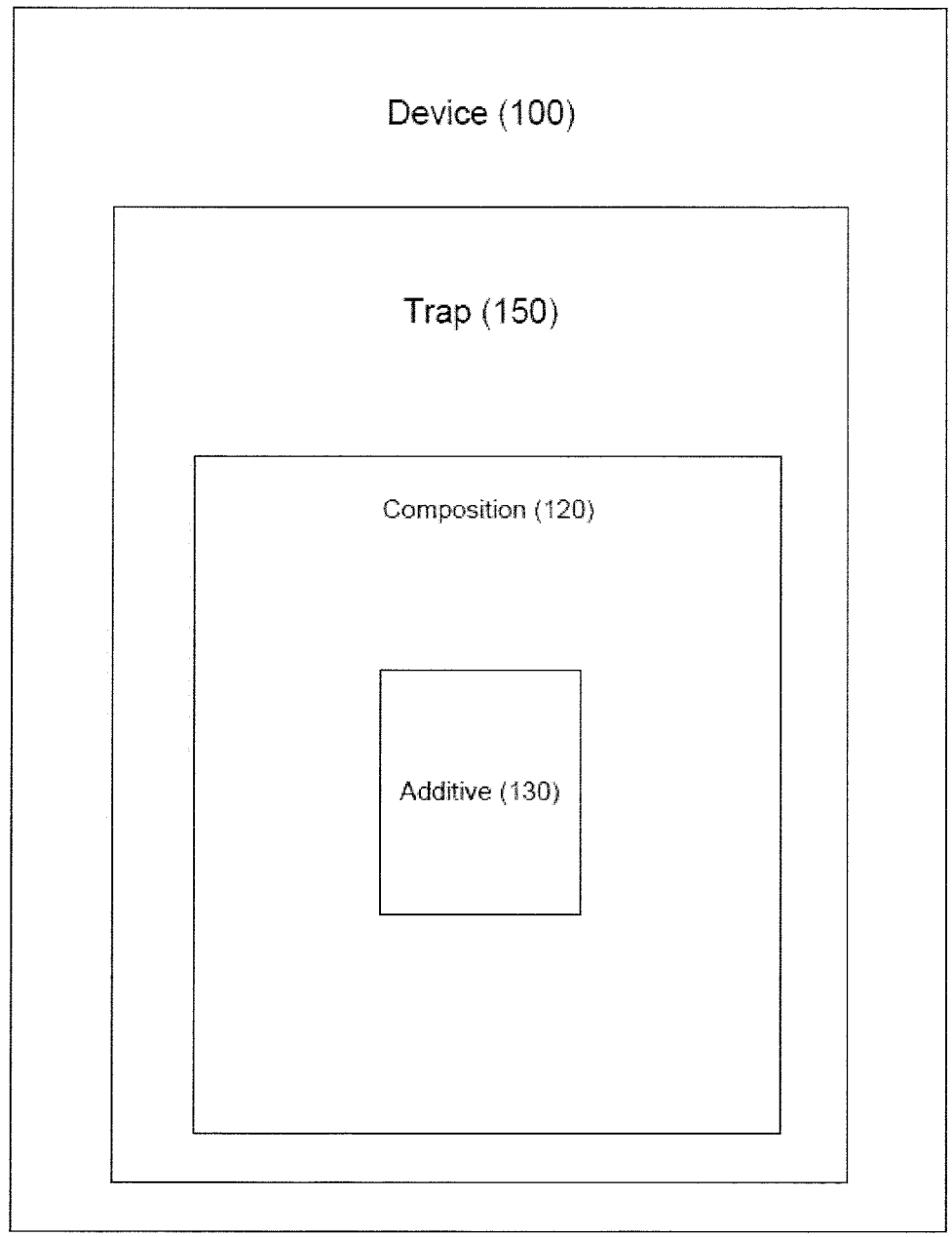
FIG. 10 depicts an example of a device according to another embodiment.

Referring to FIG. 10, a device according to an embodiment is disclosed. The device (100) of FIG. 10 can include a trap (150). The trap (150) can include a composition (120), which includes the one or more additives (130). In certain embodiments, the trap (150) can also include at least one food bait. In certain embodiments, the trap (150) can also include a housing. The composition (120) can be included within, or adjacent to, the housing within trap (150).

Figure 11:
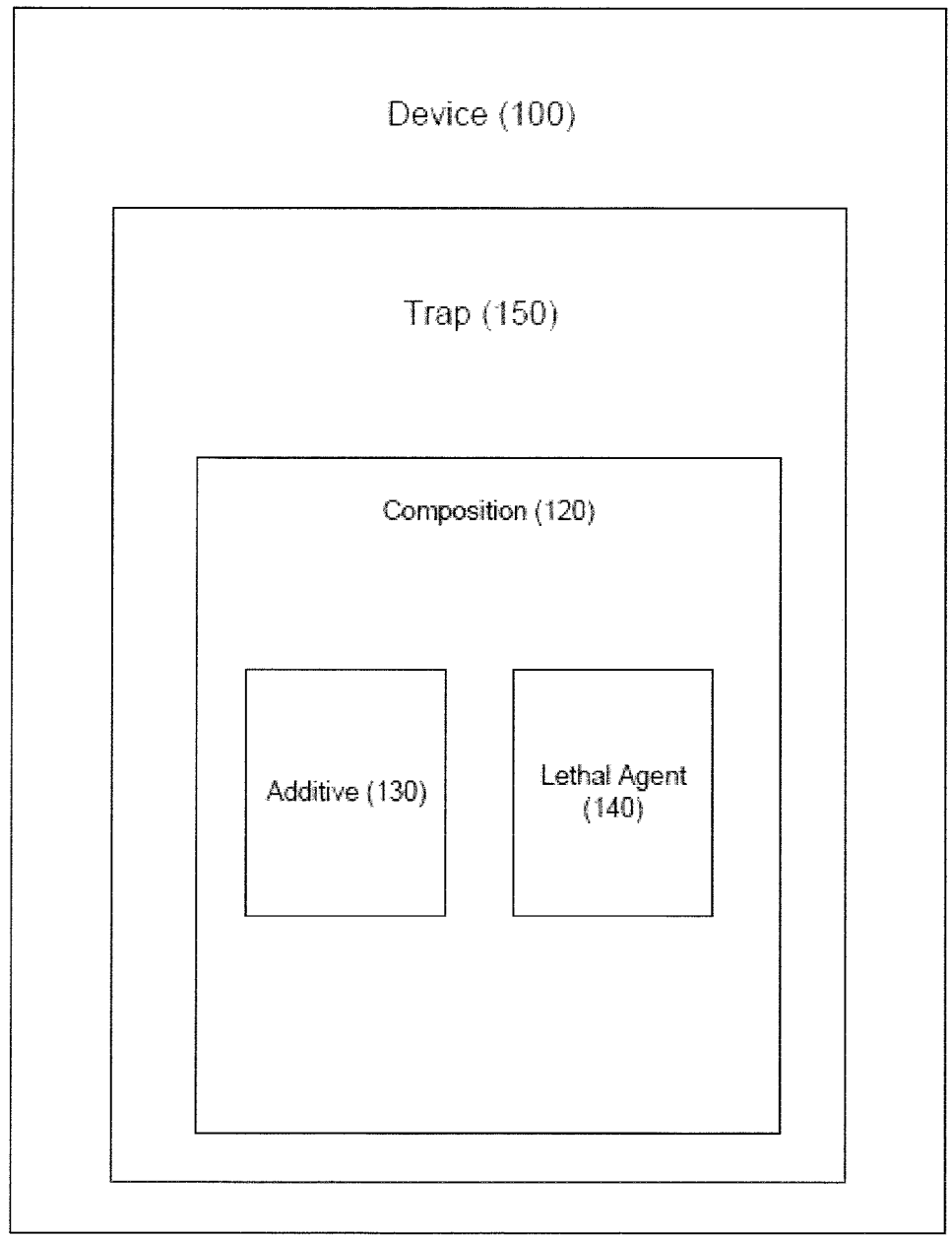
FIG. 11 depicts an example of a device according to another embodiment.

Referring to FIG. 11, a device according to an embodiment is disclosed. The device (100) of FIG. 11 can include a trap (150). The trap (150) can include a composition (120), which includes one or more additives (130) and one or more lethal agents (140). In certain embodiments, the trap (150) can also include at least one food bait. In certain embodiments, the trap (150) can also include a housing. The composition (120) can be included within, or adjacent to, the housing within trap (150).

Figure 12:
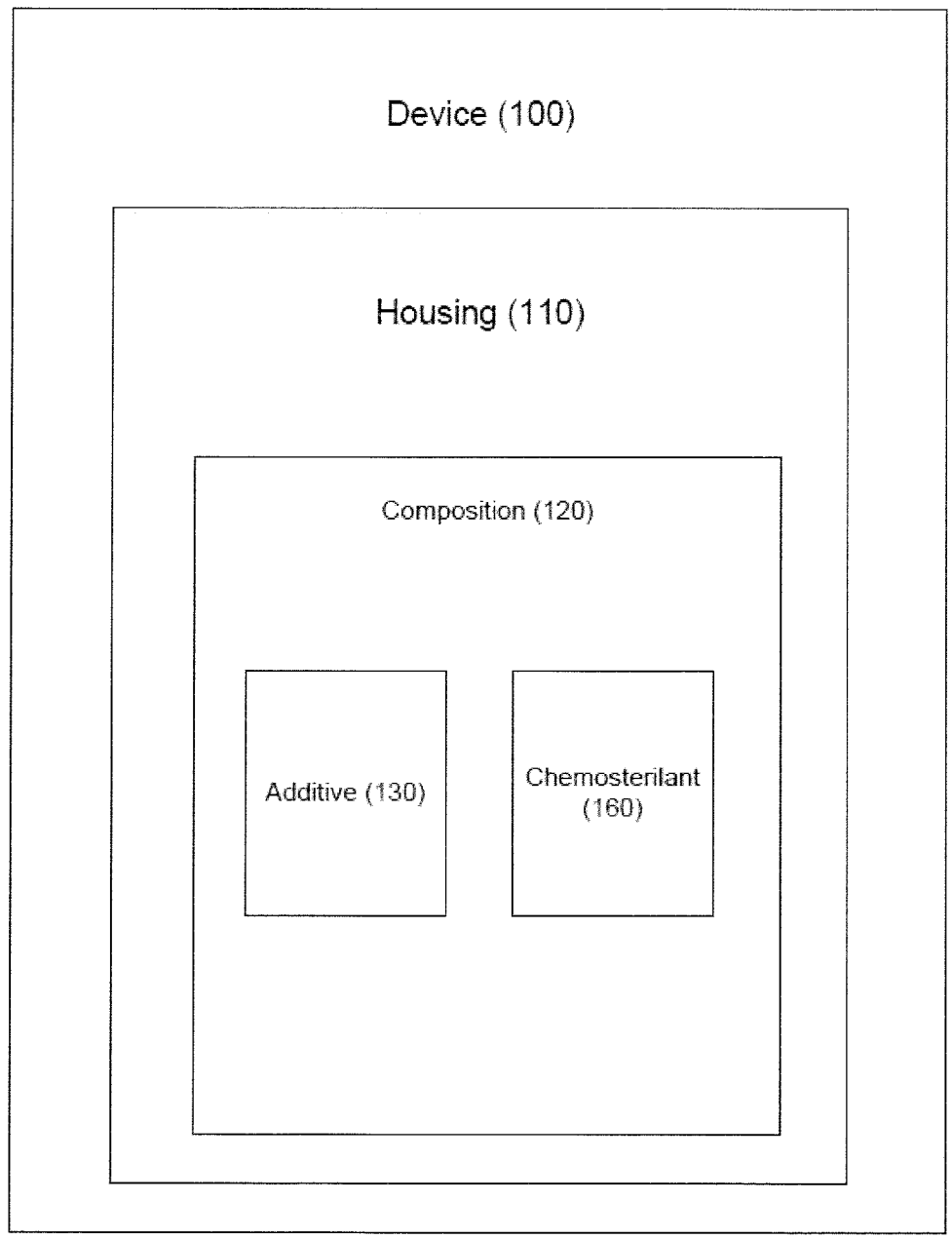
FIG. 12 depicts an example of a device according to another embodiment.

Referring to FIG. 12, a device according to an embodiment is disclosed. The device (100) of FIG. 12 can include a housing (110). The housing (110) can include a composition (120), which includes one or more additives (130) and one or more chemosterilants (160). In certain embodiments, the housing (110) can also include at least one food bait. In certain embodiments, the housing (110) can also include a trap. The composition (120) can be included within, or adjacent to, the trap within housing (110).

Figure 13:
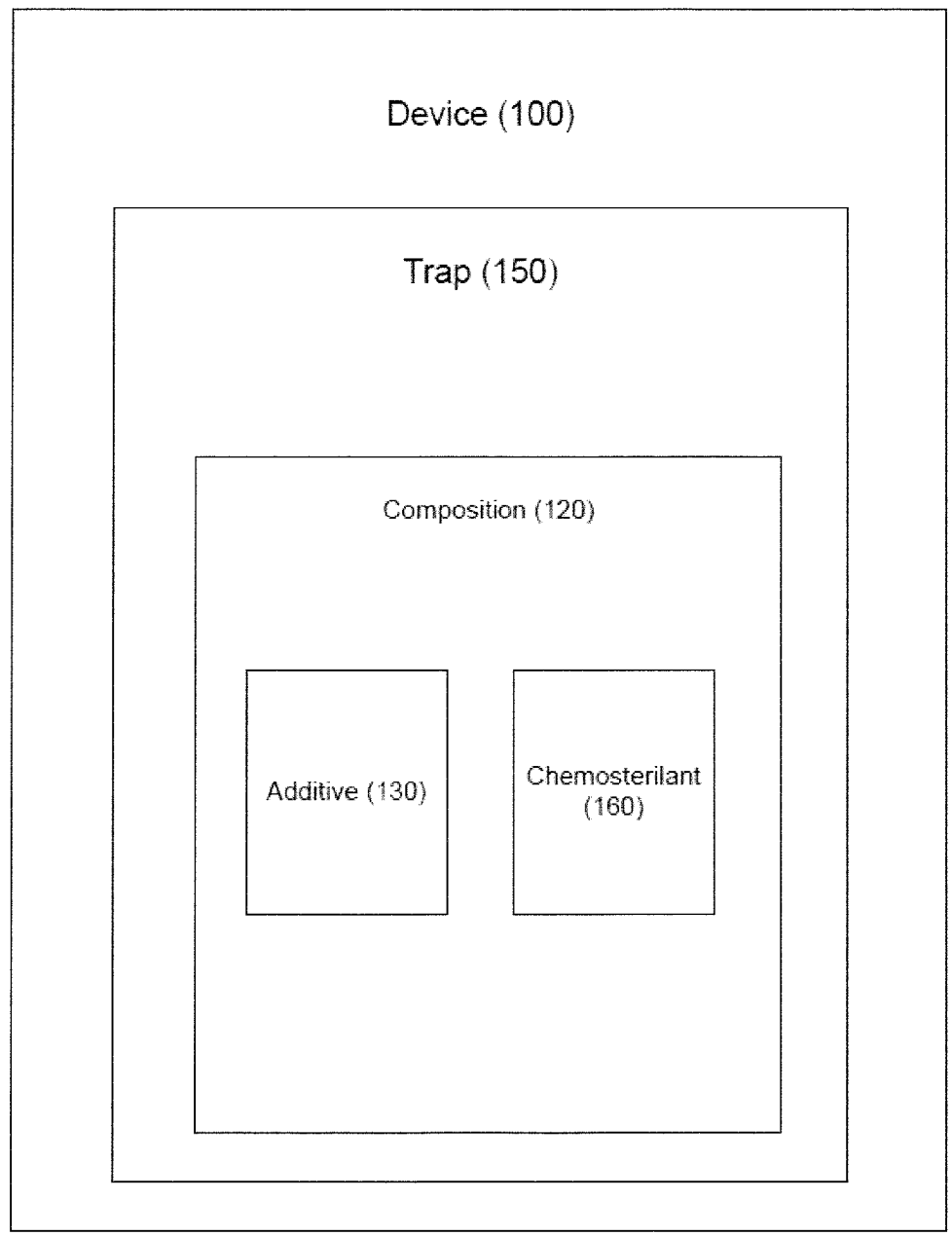
FIG. 13 depicts an example of a device according to another embodiment.

Referring to FIG. 13, a device according to an embodiment is disclosed. The device (100) of FIG. 13 can include a trap (150). The trap (150) can include a composition (120), which includes one or more additives (130) and one or more chemosterilants (160). In certain embodiments, the trap (150) can also include at least one food bait. In certain embodiments, the trap (150) can also include a housing. The composition (120) can be included within, or adjacent to, the housing within trap (150).

Figure 14:
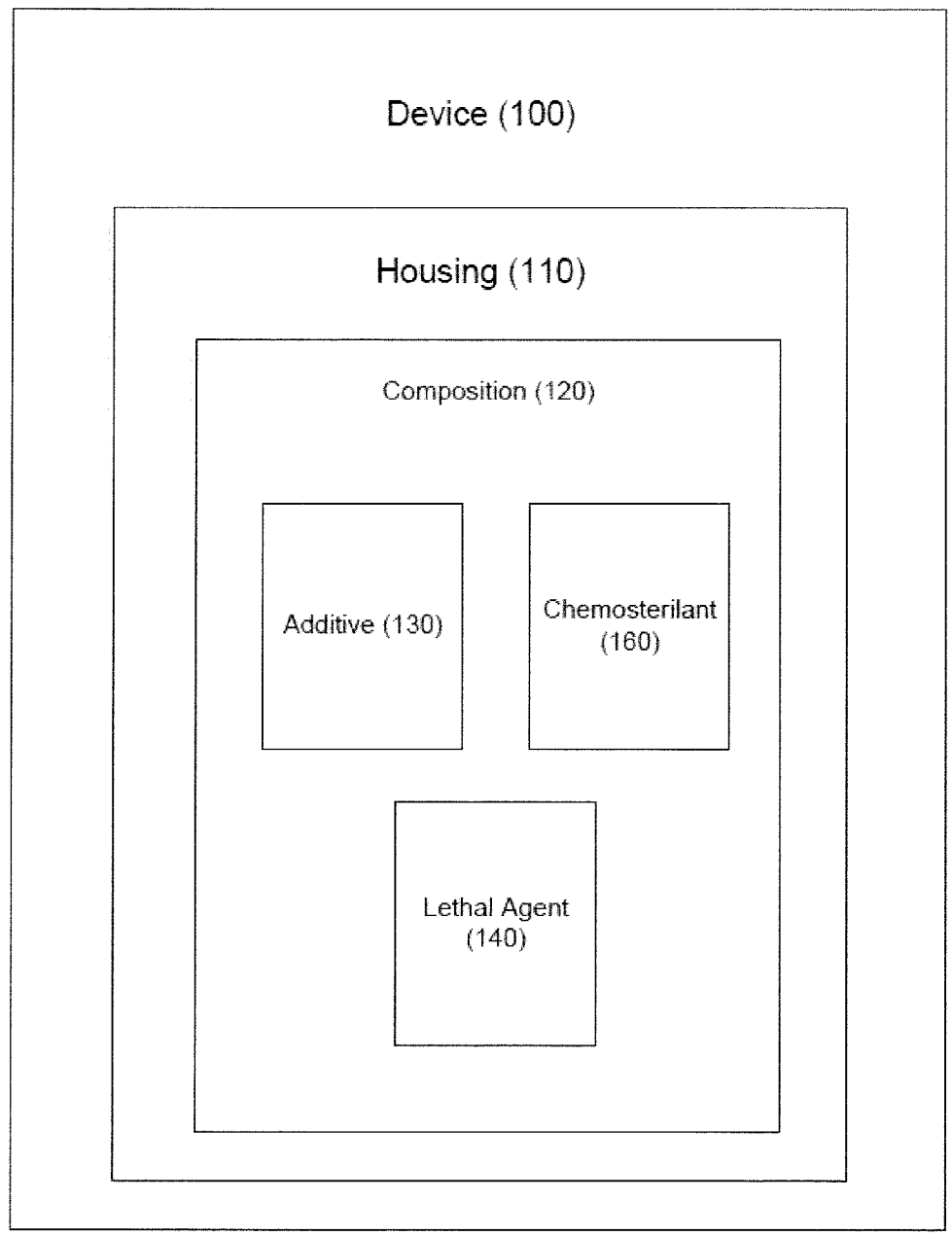
FIG. 14 depicts an example of a device according to another embodiment.

Referring to FIG. 14, a device according to an embodiment is disclosed. The device (100) of FIG. 14 can include a housing (110). The housing (110) can include a composition (120), which includes one or more additives (130), and one or more lethal agents (140) and chemosterilants (160). In certain embodiments, the housing (110) can also include at least one food bait. In certain embodiments, the housing (110) can also include a trap. The composition (120) can be included within, or adjacent to, the trap within housing (110).

Figure 15:
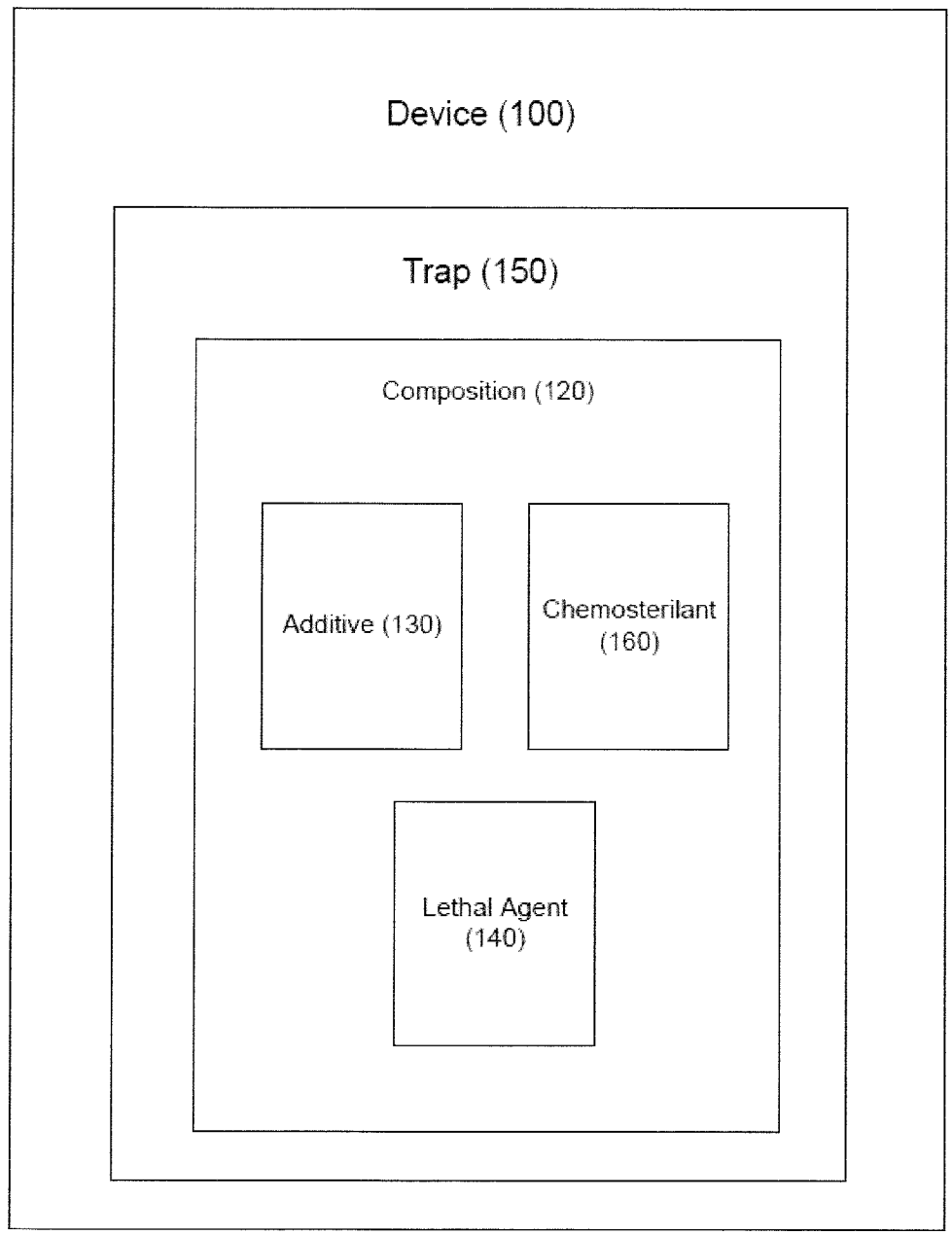
FIG. 15 depicts an example of a device according to another embodiment.

Referring to FIG. 15, a device according to an embodiment is disclosed. The device (100) of FIG. 15 can include a trap (150). The trap (150) can include a composition (120), which includes one or more additives (130), and one or more lethal agents (140) and chemosterilants (160). In certain embodiments, the trap (150) can also include at least one food bait. In certain embodiments, the trap (150) can also include a housing. The composition (120) can be included within, or adjacent to, the housing within trap (150).

Any of the embodiments described herein can be used to attract one or more rats. The one or more rats can be attracted by providing any of the compositions described herein. In certain embodiments, the one or more rats can also be immobilized or killed by a lethal agent included with the described compositions. In certain embodiments, the one or more rats can also be sterilized by a chemosterilant included with the described compositions. The composition can be provided in a dose that is sufficient to result in the attraction, and optionally, the sterilization and/or immobilization or death of the one or more rats attracted to the composition.

EXAMPLE 1—SOURCE AND MAINTENANCE OF RAT COLONY

Brown rats, Rattus norvegicus (strain: BN; UACC protocol number 958-10), were obtained from Charles River Laboratories Ltd (Sherbrooke, Québec J1E 0B5, Canada) and housed in the Animal Research Centre of Simon Fraser University ("SFU"). On arrival, rats were assigned to four groups of five males each and four groups of five females each, accommodated in cages (50 cm×40 cm×20 cm) lined with commercial corn cob bedding (Anderson's Bed o'cobs, The Andersons Inc. Maumee, Ohio 43537, USA), provided with Nalgene toys (Jaimesons Pet Food Distributers, Richmond, BC V4G 1C9, Canada), and provisioned with commercial rodent food (LabDiet® Certified Rodent Diet, LabDiet, St. Louis, Mo. 64144, USA) and water ad libitum.

EXAMPLE 2—CAPTURE OF HEADSPACE ODORANTS FROM URINE- AND FECES-SOILED BEDDING OF MALE OR FEMALE BROWN RATS

Rats in randomly assigned treatment groups, but not in control groups, were given the opportunity for 1.5 h on each of two consecutive days to see and smell opposite-sex group members through a wire mesh dividing a housing cage into two compartments. Bedding material soiled by the opposite sex lined the floor cage. After these exposures, rats were returned to their home cages with clean bedding. Following two weeks of acclimation, urine- and feces-stained bedding was removed and replaced with fresh bedding at weekly intervals. Soiled bedding (150 g) from each treatment group was placed into separate cylindrical Pyrex glass chambers (5 L), each connected to a Pyrex glass tube (15 cm×5 mm OD) filled with 200 mg of the absorbent Porapak Q. Charcoal-filtered air was drawn through each chamber and the Porapak Q volatile trap at 1 L per min for 24 h. Processing clean bedding from a control cage without rats in the same way helped differentiate between bedding and rodent volatiles in subsequent analyses. Porapak Q-captured volatiles were desorbed with two consecutive rinses of pentane (2 mL) and ether (2 mL). Pentane and ether extracts were combined and after adding dodecyl acetate as an internal standard for compound quantification were concentrated under a stream of nitrogen to 250 µL per sample.

EXAMPLE 3—ANALYSES OF PORAPAK Q HEADSPACE VOLATILE EXTRACT OF SOILED BEDDING ODORANTS FROM MALE AND FEMALE RATS BY GAS CHROMATOGRAPHY-MASS SPECTROMETRY ("GC-MS")

Aliquots (2 µL) of Porapak Q extracts of soiled bedding odorants from male and female brown rats were analyzed on a Varian Ion Trap GC-MS fitted with a DB-5 MS GC column (30 m×0.25 mm ID), setting the injector port and ion trap to 250° C., and using helium as the carrier gas (35 cm per sec) with the following temperature program: 50° C. for 5 min, 10° C. per min until 280° C. (10 min). Odorants were identified by comparing their retention indices (relative to straight chain alkanes) and mass spectra with those reported in the literature and with those of authentic standards that were available from previous work, purchased from suppliers (Sigma Aldrich Comp., St. Louis, Mo. 63103, USA; Aldrich Chemical Company Inc., Milwaukee, Wis. 53201, USA; Alfa Aesar, Heysham, LA3 2XY England), or synthesized (3-ethyl-2-pentanone, 3-ethyl-2-heptanone).

Figure 2:
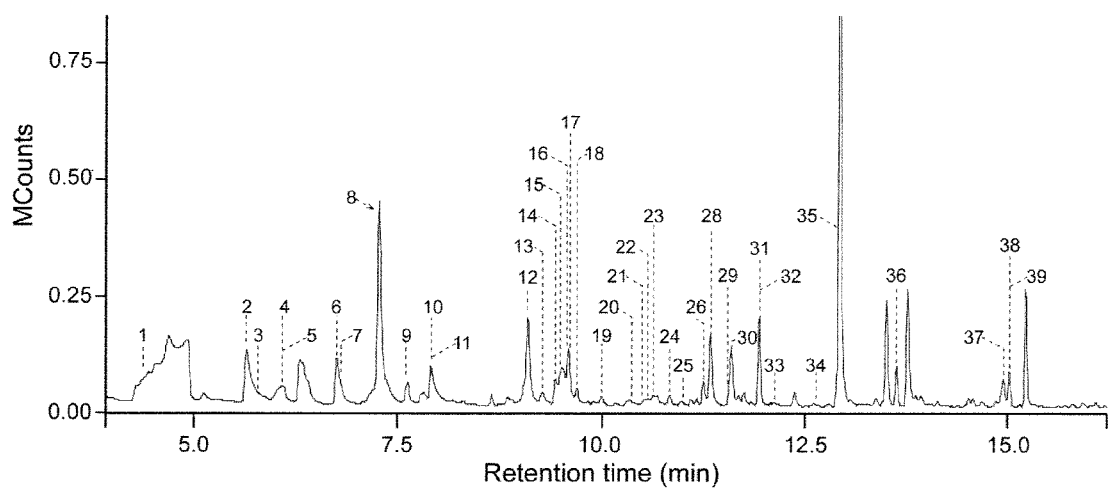
FIG. 2 depicts a total ion chromatogram showing the volatile components emanating from urine- and feces-soiled bedding material of Rattus norvegicus adult females.
Figure 3:
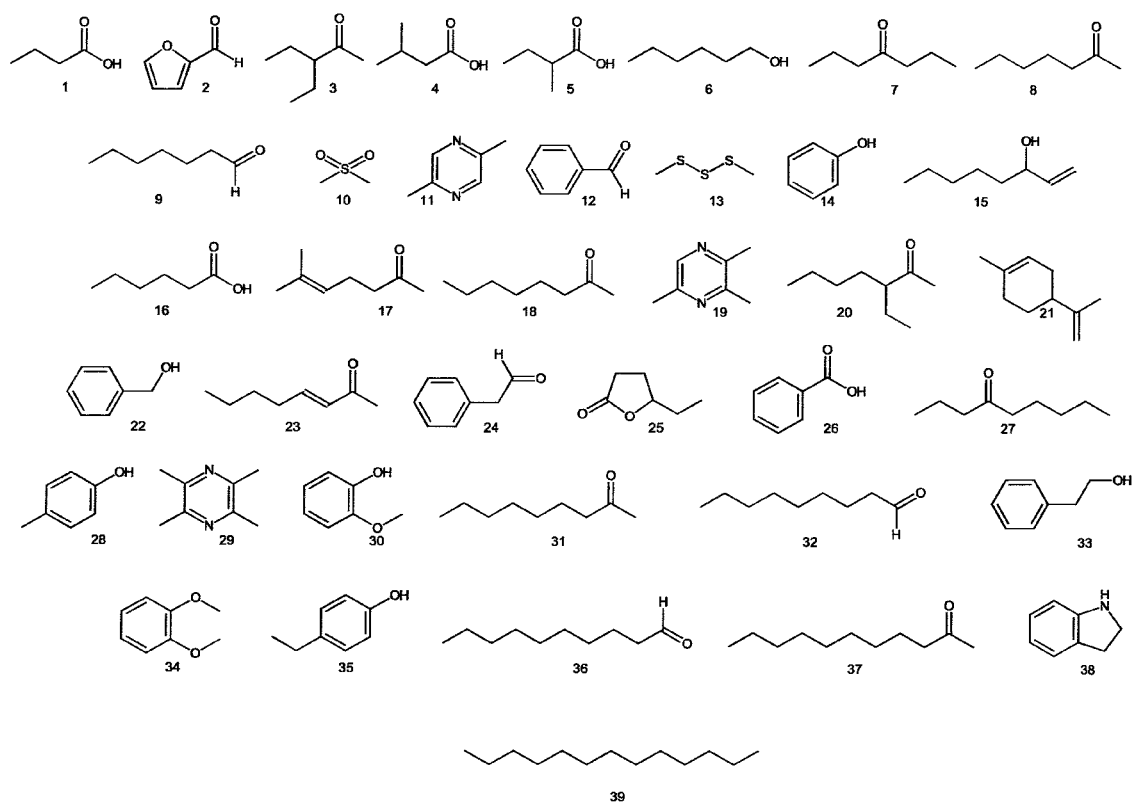
FIG. 3 depicts the chemical formulae of the volatile components of FIGS. 1 and 2.

The analyses revealed complex odor blends emanating from soiled bedding of male and female rats as depicted by the total ion chromatogram of FIGS. 1 and 2, respectively. The volatile organic compounds of the total ion chromatograms are depicted in FIG. 3. Compounds 3, 7, 8, 18, 19, 20, 27, 29, and 37 and compounds 4, 5, 9, 16, 24, 32, and 36 were specific to, or significantly more prevalent in, volatile profiles of male and female rats, respectively. Compounds 1, 2, 6, 10, 11, 12, 13, 14, 15, 17, 21, 22, 23, 35, 26, 28, 30, 31, 33, 34, 35, 38, and 39 were common to both male and female rats. The numbers in parentheses indicate Mcounts of the respective chemicals.

While many odorants were common to males and females, nine compounds (3-ethyl-2-pentanone, 2-heptanone, 4-heptanone, 3-ethyl-2-heptanone, 2-octanone, 2-nonanone, 4-nonanone, 2,3,5-trimethylpyrazine, tetramethylpyrazine) were either specific to, or most prevalent in, male bedding as depicted in FIG. 1, suggesting that some may have a pheromonal function and attract females. These odorants are referred to as the Male Pheromone Blend ("MPB"). This interpretation was supported by evidence that four of these ketones (3-ethyl-2-pentanone, 2-heptanone, 4-heptanone, 4-nonanone) steadily increased in abundance as males sexually matured during weeks 5 to 11, with three ketones (3-ethyl-2-pentanone, 4-heptanone, 4-nonanone) appearing for the first time as males progressed from week 5 to week 6. As the two pyrazines did not increase in abundance as the males sexually matured, they were not considered candidate pheromone components.

Of the seven compounds specific to female urine (3-methyl-butyric acid, 2-methyl-butyric acid, heptanal, hexanoic acid, 2-phenylacetaldehyde, nonanal and decanal) (hereinafter the Female Pheromone Blend ("FPB"), four were aldehydes as depicted in FIG. 2. Thus, the female compounds are very different from the male-specific compounds, which were mainly ketones. The difference in male- and female-specific blends suggests that both could have a pheromonal function.

EXAMPLE 4—RESPONSES OF RATS TO SYNTHETIC MALE PHEROMONE (MPB) IN LABORATORY EXPERIMENTS

The laboratory experimental design consisted of a circular galvanized steel arena (200 cm×60 cm) illuminated from above by a 7.5-W red bulb (Nalco Lighting Technologies, Norcross, Ga. 30071, USA) to facilitate observations of the rat's position. Two metal box-traps (each 25 cm×20 cm×12 cm; T. Eaton & Co. Inc., Twinsburg, Ohio 44087, USA) were placed in opposite quadrants of the arena 10 cm from the wall to serve as harbourage. Each box was baited with a cereal-based food lure (1 g) in a Petri dish (3 cm). The randomly assigned treatment box was also baited with a 1 mg blend of synthetic candidate male pheromone components (e.g., the MPB) formulated in 10 g of mineral oil and presented in an open 20-mL scintillation vial (Wheaton Industries Inc., Millville, N.J. 08332, USA). The components of the MPB were each >98% chemically pure. The MPB was formulated at the same ratio (10:100:10:1:1:10 for 2-heptanone, 4-heptanone, 3-ethyl-2-heptanone, 2-octanone, 2-nonanone and 4-nonanone, respectively) as found in headspace volatiles of male urine odor.

Two experiments were conducted testing the MPB against males (Experiment 1) and female rats (Experiment 2). For both experiments, the control trap box received the same scintillation vial filled with mineral oil (10 g) only.

For each experimental replicate, a single rat was removed from its "home" cage, and placed into a gated mesh- and sheet-metal container (25 cm×15 cm×15 cm) which was positioned in the arena equidistant to both trap boxes. After a 10-min acclimation period, the gate was raised, allowing the rat to leave the box on its own accord and to explore the arena and the trap boxes.

A rat was classed a responder if it entered a trap box. For each responding rat, two criteria were recorded and analyzed: 1) the trap box it entered first ("first entry"), and 2) the time it spent in the arena quadrants associated with a trap box ("time spent"). The latter data were obtained by recording the rat's position in any one of the four arena quadrants at each of 30 1-min intervals. Following each replicate, the arena and trap boxes were cleaned with a Percept™ disinfectant detergent (Virox Technologies Inc. Mississaugua ON L5N 5M4, Canada) and were wiped with a pet urine odor remover (Nature's Miracle®, Spectrum Brands Inc., Blacksburg, Va. 24060-6671, USA).

For these arena Experiments 1 and 2, first-choice data and the time spent in a trap box quadrant were analyzed using a $\chi^2$ test with Yates' correction for continuity ($\alpha$=0.05) and the Students' t-test ($\alpha$=0.05), respectively.

Figure 4:
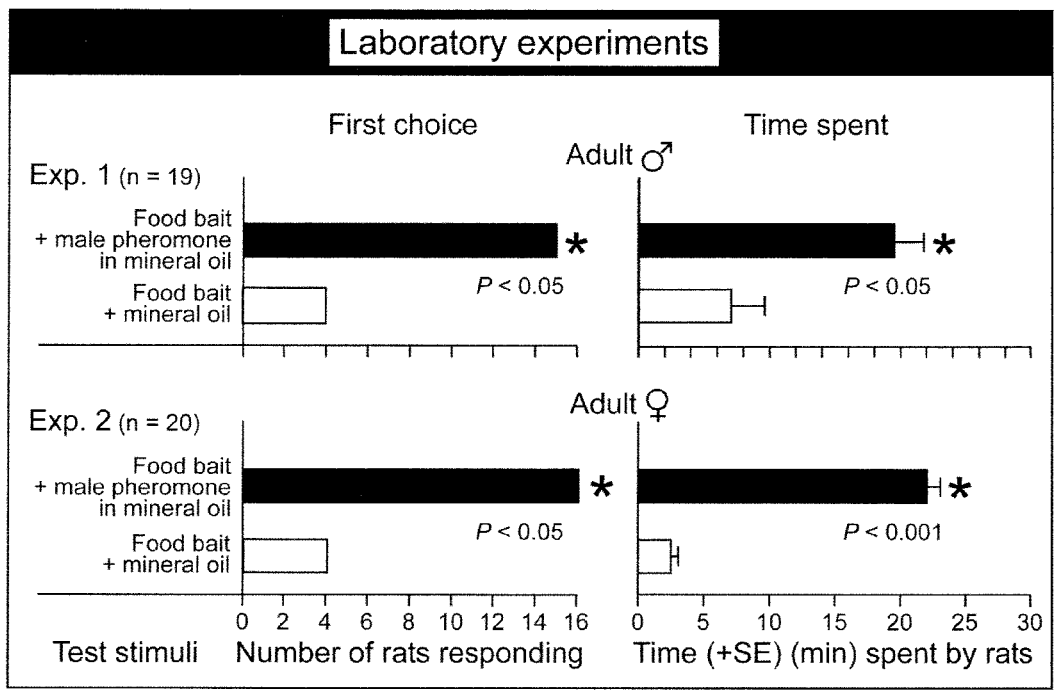
FIG. 4 depicts a graph showing the effect of the synthetic male pheromone blend ("MPB"), which includes 2-heptanone, 4-heptanone, 3-ethyl-2-heptanone, 2-octanone, 2-nonanone, and 4-nonanone, on behavioral responses of Rattus norvegicus males and females in Experiments 1 and 2 in large bioassay arenas (laboratory experiments).

The MPB proved very effective in the laboratory experiments. Both males and females spent significantly more time in quadrants associated with the MPB than in opposite control quadrants as depicted in FIG. 4 (males: df=18, $t_{crit}$=2.10, t=2.57, P=0.019; females: df=19, $t_{crit}$=2.09, t=13.23, P<0.001). Moreover, both males and females chose to first enter the trap box baited with the MPB significantly more often than the corresponding control trap as depicted in FIG. 4 (males; $\chi^2$=5.26, P=0.022; females: $\chi^2$=6.05, P=0.014).

The laboratory experiments demonstrated surprisingly and significantly that the MPB blend was attractive to both sexes. Despite the positive behavioral bioassay data obtained in these experiments with laboratory-strain brown rats, it was considered necessary to obtain definitive evidence in a field experiments prior to reaching a conclusion that male brown rat produced an attractive pheromone blend.

EXAMPLE 5—RESPONSES OF RATS TO SYNTHETIC MALE PHEROMONE BLEND (MPB) IN A FIELD EXPERIMENT

Experiment 3 tested responses of brown rats to the MPB in the field from Mar. 11, 2015 to Jun. 10, 2015. Replicates were set up on the premises of a commercial greenhouse and a hotel in the Greater Vancouver Regional District. Each experimental replicate (n=64) consisted of paired trap boxes (Protecta® Sidekick™, Bell Laboratories Inc., Madison, Wis. 53704, USA) containing armed snap traps (Victor® Easy Set® Rat Trap, Woodstream Corp, Lititz, Pa. 17543, USA) baited with a food lure. As in the laboratory experiments (EXAMPLE 4), one randomly assigned box in each pair was also baited with the candidate sex pheromone blend (MPB) formulated in mineral oil, whereas the control box received mineral oil only. The trap boxes in each pair were set up along the interior and exterior walls of glasshouses and the interior walls of the hotel basement, with 50 cm spacing between boxes in each pair and at least 5 m between pairs. Once per week, all boxes and snap traps were checked and test stimuli (food lure, MPB, and mineral oil) were replaced. Whenever a rat had been captured or the snap trap had been sprung, that box and snap trap were replaced with a new one to make sure that the odor of captured animals would not affect future captures.

Rat captures in treatment and control boxes were compared against an expected 50:50 distribution using $\chi^2$ tests with Yates' correction for continuity ($\alpha$=0.05).

Figure 5:
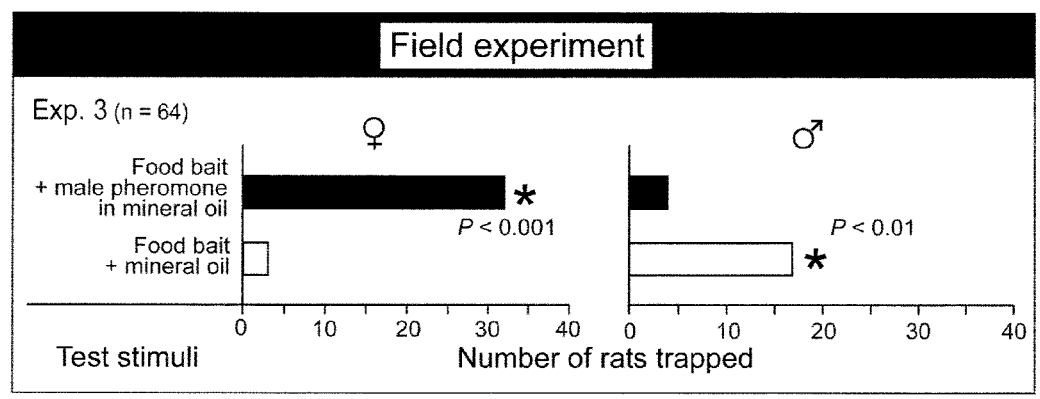
FIG. 5 depicts a graph showing the effect of the MPB on trap captures of Rattus norvegicus males and females in Experiment 3 set up in field settings.

In Experiment 3, boxes baited with the MPB captured 32 female brown rats in snap traps, whereas control boxes without the MPB captured only three females in snap traps ($\chi^2$=22.4, P<0.001) as depicted in FIG. 5. This 10-fold difference in trap captures clearly indicates that the MPB was highly attractive to wild female brown rats. In contrast to the results in Experiment 1 (EXAMPLE 4), the same MPB strongly repelled wild brown rat males. Of the 21 males captured in snap traps inside trap boxes in this experiment, only four were found in boxes baited with the MPB and 17 in control boxes without MPB ($\chi^2$=6.86, P=0.009) as depicted in FIG. 5. Similarly, in three out of four replicates where both traps in each pair had captured a brown rat, three females were in MPB-baited boxes and three males in corresponding control boxes. In the fourth replicate with double rat captures, a male brown rat was found in each trap.

The results of this field experiment surprisingly and strongly support the conclusion that male brown rats produce a pheromone blend that attracts females. While the results of the laboratory experiments showed that the MPB attracts both female and male brown rats, captures of wild rats in Experiment 3 clearly revealed that the male sex pheromone blend strongly attracts female rats but repels male rats.

Three of the sex pheromone components of male brown rats (2-heptanone, 4-heptanone and 2-nonanone) were previously detected in urine extracts, but their effects on rat behavior were classified as inducing sniffing or licking by rats in response to odor-painted glass rods inserted into their cage (Zhang, J. X. et al. 2008; Zhang, H. Y. et al. 2011). The results in FIGS. 4 and 5 constitute the first evidence that these compounds, and others tested in Experiments 1 to 3, are actually male-produced sex-attractant pheromone components. The results further suggest that the MPB may have practical utility in improving rat captures in traps baited with food baits or in improving the effectiveness of food baits laced with a lethal or chemosterilant substance.

EXAMPLE 6—RESPONSES OF RATS TO SYNTHETIC FEMALE PHEROMONE BLEND (FPB) IN LABORATORY EXPERIMENTS

Laboratory experiments 4 and 5, testing responses to the female pheromone blend (FPB), were set up, conducted, and analyzed identically to Experiments 1 and 2 in EXAMPLE 4. The components of the FPB were each >98% chemically pure. The FPB was formulated at the same ratio (20:20:10:30:5:20:10 for 2-methyl-butyric acid, 3-methyl-butyric acid, heptanal, hexanoic acid, 2-phenylacetaldehyde, nonanal and decanal, respectively) as found in headspace volatiles of female urine odor. Experiment 4 tested the FPB against males, and Experiment 5 tested the FPB against females.

Figure 6:
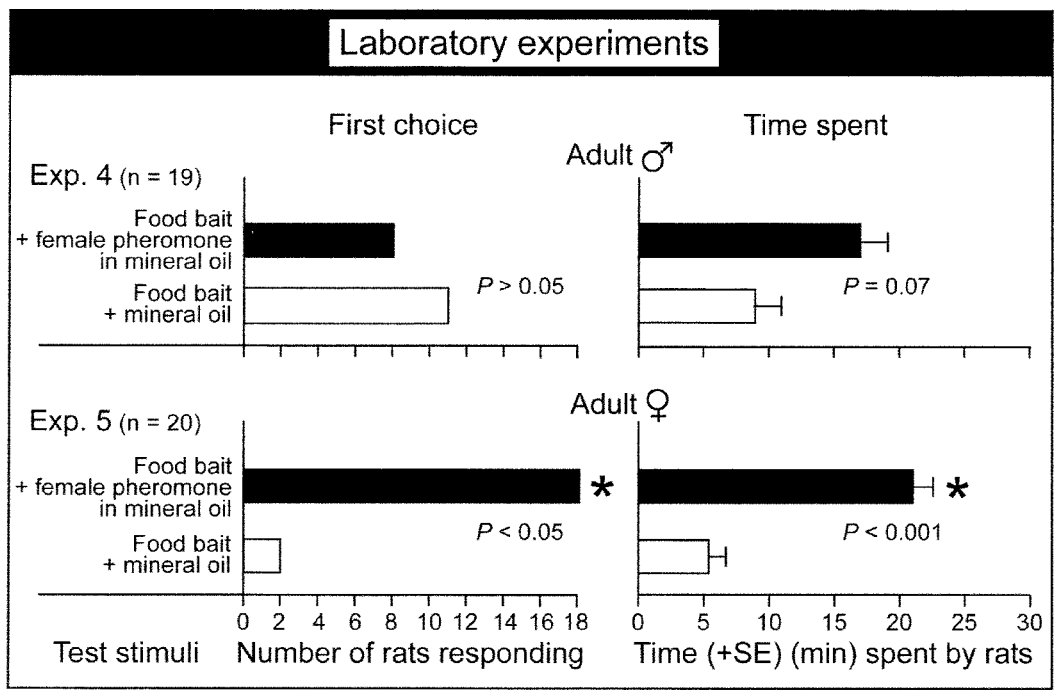
FIG. 6 depicts a graph showing the effect of the synthetic female pheromone blend ("FPB"), which includes 2-methyl-butyric acid, 3-methyl-butyric acid, heptanal, hexanoic acid, benzaldehyde, benzyl alcohol, 2-phenylacetaldehyde, nonanal, and decanal, on behavioral responses of Rattus norvegicus males and females in Experiments 4 and 5 in large bioassay arenas (laboratory experiments).

The FPB was attractive only to females in the laboratory experiments as depicted in FIG. 6. Females spent significantly more time in quadrants associated with the FPB than in opposite control quadrants (df=19, $t_{crit}$=2.09, t=5.504, P<0.001) and chose to first enter the trap box baited with the FPB significantly more often than the corresponding control box (males; $\chi^2$=12.8, P<0.001).

Experiment 4 and 5 demonstrated surprisingly and significantly that the FPB blend was attractive to female brown rats, but not to male brown rats. As with the MPB, it was considered necessary to obtain definitive evidence in a field experiment prior to reaching a conclusion that female brown rats produce an attractive pheromone.

EXAMPLE 7—RESPONSES OF RATS TO SYNTHETIC FEMALE PHEROMONE BLEND (FPB) IN A FIELD EXPERIMENT

Experiment 6 tested responses to the FPB in the field from May 12, 2015 to Jun. 24, 2015. It was set up, conducted and analyzed identically to Experiment 3 in EXAMPLE 5.

Figure 7:
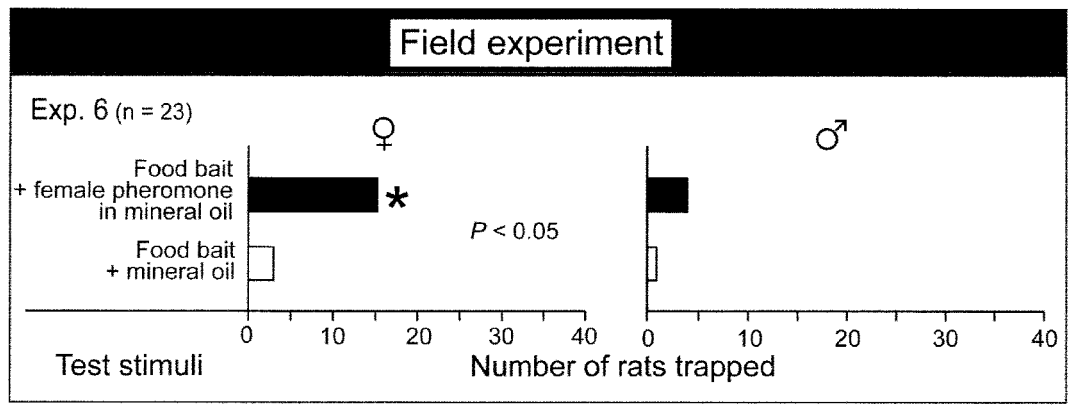
FIG. 7 depicts a graph showing the effect of the FPB on trap captures of Rattus norvegicus males and females in Experiment 6 set up in field settings.

In Experiment 6, snap traps in trap boxes baited with the FPB captured 15 female brown rats, whereas snap traps in control trap boxes without the FPB captured only 3 females as depicted in FIG. 7 ($\chi^2$=8.0, P<0.01). This 5-fold difference in trap captures clearly indicates that the FPB was attractive to wild female brown rats. Conversely, the same FPB had no effect on captures of wild brown rat males, as depicted in FIG. 7. The results of this field experiment unexpectedly and strongly support the conclusion that female brown rats produce a pheromone that attracts females. The results in FIGS. 6 and 7 constitute the first evidence for an attractive female-produced pheromone in any rodent species. They suggest that as for the MPB, the FPB may have practical utility in improving rat capture in traps baited with food baits or in improving the effectiveness of food baits laced with a lethal substance.

The following documents are hereby incorporated by reference in their entireties: Andrew, R. V. and R. W. Belknap. 1983. Efficacy of alpha-chlorhydrin in sewer rat control. Journal of Hygeine. 91: 359-366; Geo, Y. and R. V. Short. 1993. Use of oestrogen or gestagen as a potential chemosterilant for control of rat and mouse populations. Journal of Reproduction and Fertility 97: 39-49; Inglis, R., D. S. Shepherd, P. Smith, P. J. Haynes, D. S. Bull, D. P. Cowan and D. Whitehead. 1996. Foraging behaviour of wild rats (*Rattus norvegicus*) towards new foods and bait containers. Applied Animal Behaviour Science 47: 175-190; Lazarus, A. B. and F. P. Rowe. 1982. Reproduction in an island population of Norway rats, *Rattus norvegicus* (Berkenhout), treated with an oestrogenic steroid. Agr0-Ecosystems 8: 59-67; Mayer, L. P., N. A. Pearsall, P. J. Christian, P. J. Devine, C. M. Payne, M. K. McCuskey, S. L. Marion, I. G. Sipes and P. B. Hoyer. 2002. Long-term effects of ovarian follicular depletion in rats by 4-vinylcyclohexene diepoxide. Reproductive Technology 16: 775-781; Tobin, M. E., R. T. Sugihara, R. M. Engeman. 1994. Effects of initial rat captures on subsequent capture success of traps. Proceedings of the Sixteenth Vertebrate Pest Conference, 1994, Paper 62. http://digitalcommons.unl.edu/vpc16/62 [Oct. 8, 2015]; Zhang, J.-X., L. X. Sun, J.-H. Zhang and Z.-Y. Feng. 2008. Sex- and gonad-affecting scent compounds and 3 male pheromone in the rat. Chemical Senses 33: 611-621; Zhang, Y.-H. and J.-X. Zhang. 2011. Urine-derived volatiles may signal genetic relatedness in male rats. Chemical Senses 36: 125-135.

As used herein, all percentages (%) are percent by weight of the total composition, also expressed as weight/weight %, % (w/w), w/w, w/w % or simply %, unless otherwise indicated. Also, as used herein, the terms "wet" refers to relative percentages of the coating composition in a dispersion medium (e.g. water); and "dry" refers to the relative percentages of the dry coating composition prior to the addition of the dispersion medium. In other words, the dry percentages are those present without taking the dispersion medium into account. Wet admixture refers to the coating composition with the dispersion medium added. "Wet weight percentage", or the like, is the weight in a wet mixture; and "dry weight percentage", or the like, is the weight percentage in a dry composition without the dispersion medium. Unless otherwise indicated, percentages (%) used herein are dry weight percentages based on the weight of the total composition.

The dimensions and values disclosed herein are not to be understood as being strictly limited to the exact numerical values recited. Instead, unless otherwise specified, each such dimension is intended to mean both the recited value and a functionally equivalent range surrounding that value.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

Every document cited herein, including any cross-referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests, or discloses any such invention. Further, to the extent that any meaning or definition of a term in this document conflicts with any meaning or definition of the same term in a document incorporated by reference, the meaning or definition assigned to that term in the document shall govern.

The foregoing description of embodiments and examples has been presented for purposes of description. It is not intended to be exhaustive or limiting to the forms described. Numerous modifications are possible in light of the above teachings. Some of those modifications have been discussed and others will be understood by those skilled in the art. The embodiments were chosen and described for illustration of various embodiments. The scope is, of course, not limited to the examples or embodiments set forth herein, but can be employed in any number of applications and equivalent articles by those of ordinary skill in the art. Rather, it is hereby intended the scope be defined by the claims appended hereto.

What is claimed is:

1. A device comprising:
   a trap; and
   a rat attractant composition positioned in the trap, the rat attractant composition comprising a pheromone blend comprising 3-ethyl-2-pentanone, 2-heptanone, 4-heptanone, 3-ethyl-2-heptanone, 2-octanone, 2-nonanone, and 4-nonanone, the pheromone blend optionally further comprising 2,3,5-trimethylpyrazine or tetramethylpyrazine; and
   wherein the rat attractant composition is attractive to at least female rats of the species *Rattus norvegicus*.

2. The device of claim 1, wherein the rat attractant composition further comprises a lethal agent capable of causing immobilization or death to one or more rats, the lethal agent comprising one or more of an anticoagulant and a toxicant.

3. The device according to claim 2, wherein the anticoagulant comprises one or more of warfarin ((RS)-4-hydroxy-3-(3-oxo-1-phenylbutyl)-2H-chromen-2-one), chlorophacinone (2- [2-(4-chlorophenyl)-1-oxo-2-phenylethyl]indane-1,3-dione), diphacinone (2-(diphenylacetyl)-1H-indene-1,3 (2H)-dione), bromadiolone (3-[3-[4-(4-bromophenyl) phenyl]-3-hydroxy-1-phenylpropyl]-2-hydroxychromen-4-one),difethialone (3-[3-[4-(4-bromophenyl)phenyl]-1-tetralinyl]-2-hydroxy-4-thiochromenone), and brodifacoum (3-[3-[4-(4-bromophenyl)phenyl]-1,2,3,4-tetrahydronaphthalen-1-yl]-2-hydroxychromen-4-one).

4. The device according to claim 2, wherein the toxicant comprises one or more of bromethalin (N-methyl-2,4-dinitro-6-(trifluoromethyl)-N-(2',4',6'-tribromophenyl)aniline), cholecalciferol ((3 3,5Z,7E)-9,10- secocholesta-5,7,10(19)-trien-3-ol), zinc phosphide (zinc phosphide/trizinc diphosphide), and strychnine (Strychnidin-10-one).

5. The device according to claim 1, wherein the rat attractant composition further comprises a chemosterilant; and
   wherein the chemosterilant comprises one or more of mestranol, quinoestrol, diethylstilbestrol, methyl testosterone, 3-cyclopentyl ester of 17α-hexa-1'3'-diynyloestra-1,3,5(10)-trien-17β-ol, α-chlorhydrin, and 4-vinylcyclohexene diepoxide.

6. The device according to claim 1, wherein each compounds of the pheromone blend is synthetic or purified.

7. The device according to claim 1, wherein the rat attractant composition further comprises a food bait; and
   wherein the food bait comprises meat, cheese, eggs, grains, nuts, fish, fruits, or combinations thereof.

8. The device according to claim 1, wherein the rat attractant composition further comprises a food bait; and
   wherein the food bait comprises lard, cracklings, cereal flour, cereal bran, gelling agent, sugar, vegetable oil, fish oil, emulsifier, humectant, 2-hydroxy-3-methylcyclopent-2-en-1-one, 2,3-butanedione, 3-methylbutanal, 5-methyl-(E)-2-hepten-4-one, 3-methyl-4-heptanone, γ-octalactone, dimethyl trisulfide, butyric acid, or combinations thereof.

9. The device according to claim 1, wherein the rat attractant composition further comprises one or more additional components, wherein each of the one or more additional components is furan-2-carbaldehyde, 1-hexanol, dimethyl sulfone, 2,5-dimethyl pyrazine, benzaldehyde, phenol, 1-octen-3-ol, 6-methyl-5-hepten-2-one, 1-methyl-4-(1-methylethenyl)-cyclohexene, benzyl alcohol, (3E)-octen-2-one, 5-ethyldihydrofuran-2 (3H)-one, benzoic acid, 4-methylphenol, 2,3,5,6-tetramethylpyrazine, 2-methoxyphenol, 2-phenylethan-1-ol, 1,2-dimethoxybenzene, 4-ethylphenol, 2-undecanone, 1H-indole, tridecane, 4-hydroxy-2,5-dimethylfuran-3-one, 6-methyl-4-heptanone, nonanoic acid, decanoic (capric) acid, dodecanoic (lauric) acid, tetradecanoic (myristic) acid, hexadecanoic (palmitic) acid, (Z)-octadec-9-enoic (oleic) acid, octadecanoic (stearic) acid, lactic acid, or glycerol.

10. The device according to claim 1, wherein the rat attractant composition is in a form of a granule, a solid block, a gel, a paste, a liquid, or a combination thereof.

11. The device according to claim 1, wherein the pheromone blend consists of 3-ethyl-2-pentanone, 2-heptanone, 4-heptanone, 3-ethyl-2-heptanone, 2-octanone, 2-nonanone, 4-nonanone, optionally 2,3,5-trimethylpyrazine, and optionally tetramethylpyrazine.

12. A device comprising:
    a housing for receiving one or more rats; and
    a rat attractant composition comprising a pheromone blend comprising 3 ethyl-2-pentanone, 2-heptanone, 4-heptanone, 3-ethyl-2-heptanone, 2-octanone, 2-nonanone, and 4-nonanone, the pheromone blend optionally further comprising 2,3,5-trimethylpyrazine or tetramethylpyrazine;
    wherein the rat attractant composition is adjacent to or included within the housing; and
    wherein the rat attractant composition is attractive to at least female rats of the species *Rattus norvegicus*.

13. The device of claim 12 further comprising one or more traps, each of the one or more traps comprising an immobilizing trap, an impaling trap, a compression trap, an asphyxiation trap, an electrocution trap, a catch-and-release trap, or a combination thereof.

14. The device according to claim 12, wherein the rat attractant composition further comprises one or more of a lethal agent, a food bait, and a chemosterilant.

15. The device according to claim 12, wherein the device is capable of producing an acoustic signal.

16. A method of attracting one or more rats, the method comprising:
provided a device, the device comprising a trap and a rat attractant composition positioned in the trap, the rat attractant composition comprising:
a pheromone blend comprising 3-ethyl-2-pentanone, 2-heptanone, 4-heptanone, 3-ethyl-2-heptanone, 2-octanone, 2-nonanone, and 4-nonanone, the pheromone blend optionally further comprising 2,3,5-trimethylpyrazine or tetramethylpyrazine; and
wherein the rat attractant composition is attractive to at least female rats of the species *Rattus norvegicus*.

17. The method according to claim 16, wherein the trap is an immobilizing trap, an impaling trap, a compression trap, an asphyxiation trap, an electrocution trap, a catch-and-release trap, or a combination thereof.

18. The method according to claim 16, wherein the rat attractant composition further comprises one or more of a lethal agent, a food bait, and a chemosterilant.

19. The method according to claim 16, wherein the pheromone blend consists of 3-ethyl-2-pentanone, 2-heptanone, 4-heptanone, 3-ethyl-2-heptanone, 2-octanone, 2-nonanone, 4-nonanone, optionally 2,3,5-trimethylpyrazine, and optionally tetramethylpyrazine.

* * * * *